US009760157B2

(12) United States Patent  
Kleiber

(10) Patent No.: US 9,760,157 B2
(45) Date of Patent: Sep. 12, 2017

(54) METHODS FOR OPERATING AN APPARATUS HAVING MULTIPLE STAND-BY MODES

(75) Inventor: Emanuel Kleiber, Winterthur (CH)

(73) Assignee: THOMSON LICENSING, Issy-les-Moulineaux (FR)

(*) Notice: Subject to any disclaimer, the term of this patent is extended or adjusted under 35 U.S.C. 154(b) by 332 days.

(21) Appl. No.: 13/817,256

(22) PCT Filed: Aug. 18, 2010

(86) PCT No.: PCT/IB2010/002039
§ 371 (c)(1),
(2), (4) Date: Feb. 15, 2013

(87) PCT Pub. No.: WO2012/022996
PCT Pub. Date: Feb. 23, 2012

(65) Prior Publication Data
US 2013/0145194 A1 Jun. 6, 2013

(51) Int. Cl.
*G06F 1/00* (2006.01)
*G06F 1/32* (2006.01)
*H04N 5/63* (2006.01)

(52) U.S. Cl.
CPC .......... *G06F 1/3287* (2013.01); *G06F 1/3228* (2013.01); *H04N 5/63* (2013.01)

(58) Field of Classification Search
CPC .... G06F 1/3203; G06F 1/3237; G06F 1/3268; G06F 1/329; G06F 1/32; G06F 1/3287; G06F 1/3228

(Continued)

(56) References Cited

U.S. PATENT DOCUMENTS 5,502,546 A 3/1996 Muto
5,987,613 A 11/1999 Busch et al.
(Continued)

FOREIGN PATENT DOCUMENTS

CN 101950198 1/2011
EP 0 697 645 A2 2/1996
(Continued)

*Primary Examiner* — Thomas Lee
*Assistant Examiner* — Zhipeng Wang
(74) *Attorney, Agent, or Firm* — Jerome G. Schaefer

(57) ABSTRACT

A method for operating an apparatus, such as a video signal receiver, having first and second stand-by modes when the apparatus is in an off state, wherein the first stand-by mode provides a different start-up time and consumes a different amount of power than the second stand-by mode, is capable of saving power without requiring a user to wait a long time for a start-up sequence. According to an exemplary embodiment, the method includes enabling display of a user interface allowing user selections for a plurality of different time periods of a day; and enabling a user to select, via the user interface, one of at least three different options for each one of the different time periods, wherein a first one of the options includes setting the apparatus to the first stand-by mode for the time period, a second one of the options includes setting the apparatus to the second stand-by mode for the time period, and a third one of the options includes setting the apparatus to a statistical mode for the time period, wherein the statistical mode includes setting the apparatus to one of the first and second stand-by modes for the time period based on a user's past viewing habits during the time period.

9 Claims, 7 Drawing Sheets

(58) Field of Classification Search
USPC ...................................................... 713/3, 323
See application file for complete search history.

(56) References Cited

U.S. PATENT DOCUMENTS

| | | | |
|---|---|---|---|
| 6,243,548 B1* | 6/2001 | Hebert | B41J 29/393 399/79 |
| 6,654,895 B1* | 11/2003 | Henkhaus | G06F 1/3203 710/18 |
| 6,961,859 B2 | 11/2005 | Derocher | |
| 7,639,962 B2 | 12/2009 | Hayashi et al. | |
| 2002/0073352 A1 | 6/2002 | Okubo et al. | |
| 2003/0145242 A1* | 7/2003 | Derocher | G06F 1/3203 713/320 |
| 2005/0286872 A1 | 12/2005 | Kobayashi | |
| 2007/0143698 A1 | 6/2007 | Iwata | |
| 2008/0052740 A1 | 2/2008 | Sakai et al. | |
| 2008/0126815 A1* | 5/2008 | Cantwell | G06F 1/3203 713/323 |
| 2008/0184050 A1* | 7/2008 | Yamaji | G06F 9/4418 713/323 |
| 2009/0041438 A1* | 2/2009 | Kuno | G11B 19/02 386/235 |
| 2009/0092011 A1* | 4/2009 | Matsushita | G11B 19/00 369/47.5 |
| 2009/0119527 A1* | 5/2009 | Kim | G06F 1/3203 713/323 |
| 2010/0115309 A1* | 5/2010 | Carvalho | G06F 1/32 713/320 |
| 2012/0083223 A1 | 4/2012 | Li et al. | |

FOREIGN PATENT DOCUMENTS

| | | |
|---|---|---|
| EP | 1 617 315 A1 | 1/2006 |
| EP | 2 051 379 A1 | 4/2009 |
| GB | 2 372 112 A | 8/2002 |
| GB | 2 384 926 A | 8/2003 |
| JP | 07212678 | 8/1995 |
| JP | 2006014043 | 1/2006 |
| JP | 2007-142708 | 6/2007 |
| JP | 2008-22115 | 1/2008 |
| JP | 2008054085 | 3/2008 |
| JP | 4437154 | 1/2010 |
| JP | 2010-62708 | 3/2010 |
| WO | 98/48498 | 10/1998 |
| WO | 2010/019691 A1 | 2/2010 |

* cited by examiner

User is watching TV:

600 ~ ON

12:00　15:00

DSTB's internal accumulation:

610 ~ { 1.25 / 1.00 / 0.75 / 0.50 / 0.25

11:30　　15:30

User is watching TV:

700 ~ ON

12:00　15:00

DSTB's internal accumulation:

710 ~ { 1.25 / 1.00 / 0.75 / 0.50 / 0.25

10:30　　16:30

METHODS FOR OPERATING AN APPARATUS HAVING MULTIPLE STAND-BY MODES

This application claims the benefit, under 35 U.S.C. §365 of International Application PCT/IB2010/002039, filed Aug. 18, 2010, which was published in accordance with PCT Article 21(2) on Feb. 23, 2012 in English.

BACKGROUND OF THE INVENTION

Field of the Invention

The present invention generally relates to methods for operating an apparatus, such as a video signal receiver, having multiple stand-by modes when the apparatus is in an off state.

Background Information

Certain modern apparatuses, such as digital set-top boxes (DSTBs) and personal computers (PCs), may have two different stand-by modes when they are in an off state. One of these stand-by modes typically provides a faster start-up time for the apparatus and consumes more power than the other stand-by mode, which needs a longer start-up time but consumes less power. For practical reasons (e.g., reception of program guide data and fast start-up), certain such apparatuses may stay primarily in the stand-by mode that provides a faster start-up time and consumes more power when turned off. While this approach provides the advantage of a shorter start-up time when the apparatus is turned on, it is disadvantageous in that it may consume power unnecessarily.

Another approach to managing these two different stand-by modes is to employ a timer and switch an apparatus from the stand-by mode that provides a faster start-up time and consumes more power to the other (more energy-efficient) stand-by mode after a certain time period passes. While this approach provides the advantage of conserving power, it is disadvantageous in that it may require users to wait a relatively long time for the apparatus to start-up after it is turned on.

Accordingly, there is a need in the art to address the foregoing issues and thereby provide improved methods for operating an apparatus, such as a video signal receiver, having the aforementioned different stand-by modes when the apparatus is in an off state. The present invention described herein addresses these and/or other issues.

SUMMARY OF THE INVENTION

In accordance with an aspect of the present invention, a method for operating an apparatus, such as a video signal receiver, having first and second stand-by modes when the apparatus is in an off state, wherein the first stand-by mode consumes a different amount of power than the second stand-by mode, is disclosed. According to an exemplary embodiment, the method comprises enabling a user to select one of at least three different options for each one of a plurality of different time periods of a day, wherein a first one of the options includes setting the apparatus to the first stand-by mode for the time period, a second one of the options includes setting the apparatus to the second stand-by mode for the time period, and a third one of the options includes setting the apparatus to a statistical mode for the time period, wherein the statistical mode includes setting the apparatus to one of the first and second stand-by modes for the time period based on a user's past viewing habits during the time period. The user selection may, for example, be performed via an on-screen user interface.

In accordance with another aspect of the present invention, an apparatus, such as a video signal receiver, having first and second stand-by modes when in an off state, wherein the first stand-by mode consumes a different amount of power than the second stand-by mode, is disclosed. According to an exemplary embodiment, the apparatus comprises means, such as a processor, for enabling a user to select one of at least three different options for each one of a plurality of different time periods of a day, wherein a first one of the options includes setting the apparatus to the first stand-by mode for the time period, a second one of the options includes setting the apparatus to the second stand-by mode for the time period, and a third one of the options includes setting the apparatus to a statistical mode for the time period, wherein the statistical mode includes setting the apparatus to one of the first and second stand-by modes for the time period based on a user's past viewing habits during the time period; and means, such as a memory, for storing data corresponding to the user selections. The user selection may, for example, be performed via an on-screen user interface displayed under the control of a processor.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
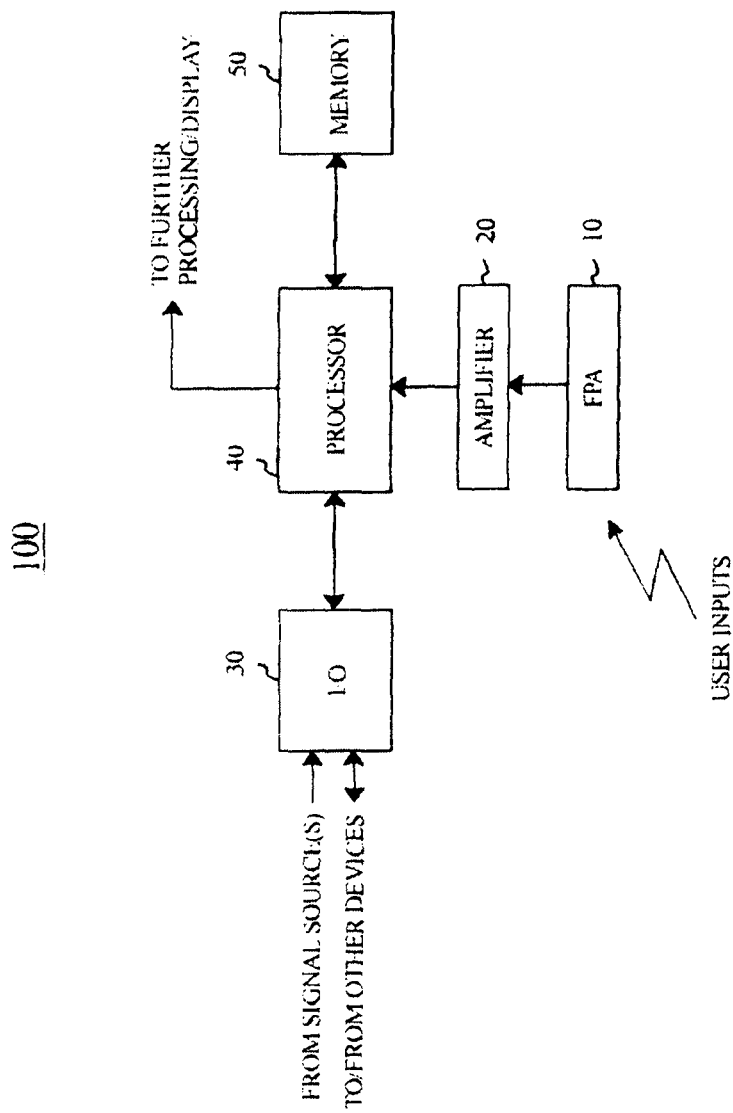
FIG. 1 shows a block diagram of an apparatus having first and second stand-by modes according to an exemplary embodiment of the present invention.

Referring now to the drawings, and more particularly to FIG. 1, a block diagram of an apparatus 100 according to an exemplary embodiment of the present invention is shown. According to an exemplary embodiment, apparatus 100 is embodied as a video signal receiver, such as a digital set-top box (DSTB), operative to receive and process electrical signals, such as audio, video and/or data signals, but may be embodied as any type of electronic device and/or apparatus (with or without an integrated display device) having at least two different stand-by modes when in an off state. For purposes of example and explanation, the present invention may be described herein with specific reference to DSTBs.

According to the exemplary embodiments described herein, apparatus 100 has at least two different stand-by modes when in an off state, including a first stand-by mode, referred to herein as M1, and a second stand-by mode, referred to herein as M2. According to these exemplary embodiments, first stand-by mode M1 provides a faster start-up time for apparatus 100 and consumes more power than second stand-by mode M2. For example, first stand-by mode M1 provides a start-up time for apparatus 100 of about 1-2 seconds and has a power consumption of approximately 35 watts. In contrast, second stand-by mode M2 provides a start-up time for apparatus 100 of about 40 seconds and has a power consumption of approximately 6 watts. Of course, these start-up times and power consumptions are exemplary only, and are not intended to limit the present invention in any manner.

Apparatus 100 of FIG. 1 comprises front panel means such as front panel assembly (FPA) 10, coupling means such as amplifier 20, and input/output (I/O) means such as I/O block 30, processing means such as processor 40, and memory means such as memory 50. Some of the foregoing elements of FIG. 1 may be embodied using one or more integrated circuits (ICs). For clarity of description, certain conventional elements associated with apparatus 100 such as certain control signals, power signals and/or other elements may not be shown in FIG. 1.

FPA 10 is operative to receive user inputs from a user input device (not shown in FIGS.) associated with apparatus 100, and to output signals corresponding to the user inputs to amplifier 20. According to an exemplary embodiment, FPA 10 receives signals, such as infrared and/or radio frequency signals, from the user input device and generates corresponding signals which are output to amplifier 20. FPA 10 may also have built-in keys. Amplifier 20 is operative to amplify the signals provided from FPA 10 for output to processor 40. Amplifier 20 may be an optional element depending on implementation.

I/O block 30 is operative to perform I/O functions of apparatus 100. According to an exemplary embodiment, I/O block 30 is operative to receive signals such as audio, video and/or data signals in analog and/or digital format from one or more signal sources such as terrestrial, cable, satellite, internet and/or other signal sources. I/O block 30 may also be operative to output signals to one or more other devices, and to receive signals from such devices.

Processor 40 is operative to perform various signal processing and control functions of apparatus 100. According to an exemplary embodiment, processor 40 processes the audio, video and/or data signals provided from I/O block 30 by performing functions including tuning, demodulation, forward error correction, and transport processing functions to thereby generate digital data representing audio, video and/or data content. The digital data produced from such processing functions may be provided for further processing and/or output (e.g., display).

Processor 40 is also operative to execute software code that facilitates and enables performance of the various embodiments and methods of the present invention described herein. As indicated above and described later herein, apparatus 100 includes two different stand-by modes when in an off state, namely first stand-by mode M1 and second stand-by mode M2. Processor 40 controls the switching of apparatus 100 between on and off states (e.g., responsive to user inputs, etc.), and also controls the switching of apparatus 100 between first stand-by mode M1 and second stand-by mode M2 when in the off state according to various methods, including a manual definition method, an automatic learning method (i.e., statistical mode), and a combined method which combines principles of the two aforementioned methods. Further details regarding these aspects of the present invention will be provided later herein.

Processor 40 is also operative to perform and/or enable other functions of apparatus 100 including, but not limited to, processing user inputs made via user input device(s), enabling on-screen displays, reading and writing data from and to memory 50, and/or other operations.

Memory 50 is operatively coupled to processor 40 and performs data storage functions of apparatus 100. According to an exemplary embodiment, memory 50 stores data including, but not limited to, software code, on-screen display (e.g., menu(s), etc.) data, user selection/setup data (e.g., user-specified time tables), statistically-generated time tables, and/or other data.

As will be described hereinafter, the principles of the present invention may be employed to advantageously provide a desired balance between fast start-up times for apparatus 100, as associated with first stand-by mode M1, and power conservation, as associated with second stand-by mode M2.

Figure 2:
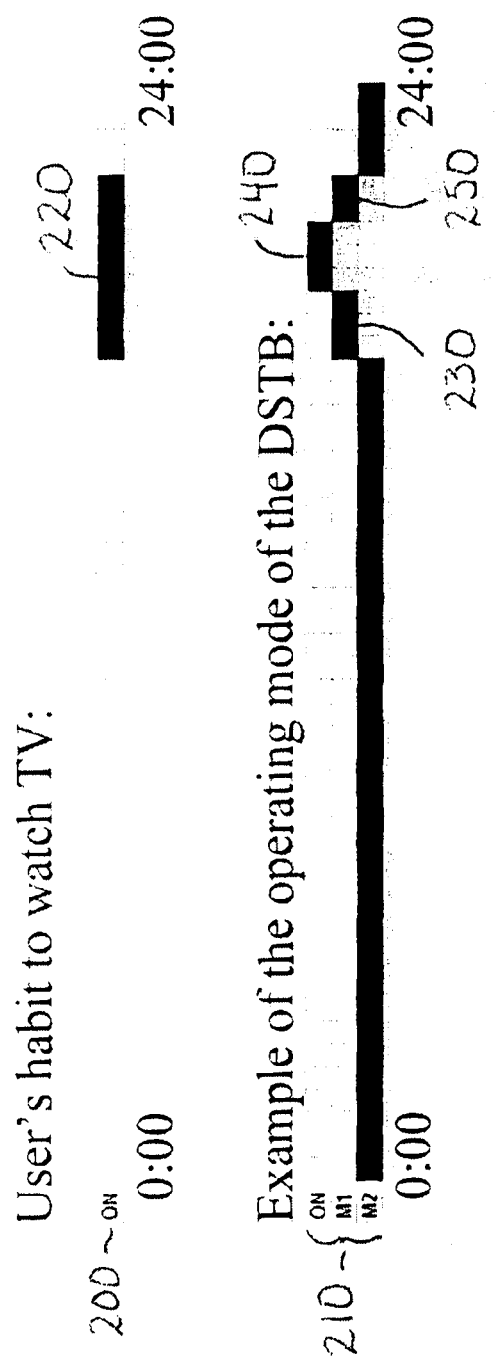
FIG. 2 shows graphs representing the operation of the apparatus of FIG. 1 according to an exemplary embodiment of the present invention.

Referring to FIG. 2, graphs 200 and 210 representing the operation of apparatus 100 according to an exemplary embodiment of the present invention are shown. According to this exemplary embodiment, apparatus 100 provides a manual definition method in which a user provides inputs to apparatus 100 responsive to an editable on-screen menu and thereby manually defines a time table that dictates when apparatus 100 is in first stand-by mode M1 and second stand-by mode M2. The time table is made up of a plurality of different time periods of a day, each having a start time and a stop time defined by the user.

According to one exemplary embodiment, the user may define the time table for a single day which is used for every day of the week. In this manner, the defined time periods for first stand-by mode M1 and second stand-by mode M2 would be the same every day. Alternatively, weekdays and weekends may be defined separately. Alternatively still, each day of the week may be defined independently, thus providing the user with a maximum amount of flexibility in defining when apparatus 100 is in first stand-by mode M1 and second stand-by mode M2. This latter alternative may be particularly useful if the user has different viewing habits for each day of the week.

As indicated by graph 200 of FIG. 2, the user has the habit of watching television (and thus turning on apparatus 100) in the evening between 18:00 and 22:00 (block 220). Accordingly, in the aforementioned time table, the user has set apparatus 100 to be in first stand-by mode M1 between 18:00 and 22:00, and to be in second stand-by mode M2 for the remaining time periods. Of course, as will be described below, these user settings are overridden and do not apply for the time period(s) when apparatus 100 is turned on.

Graph 210 of FIG. 2 then shows the operation of apparatus 100 with the aforementioned exemplary user settings in place. In particular, apparatus 100 automatically switches from second stand-by mode M2 to first stand-by mode M1 at 18:00 (block 230). The user later turns apparatus 100 on at 19:30 and watches television for the next 90 minutes (block 240). Then, when the user is finished watching television and turns apparatus 100 off at 21:00, apparatus 100 enters first stand-by mode M1 for another 60 minutes until 22:00 (block 250), and thereafter automatically switches to second stand-by mode M2.

Figure 3:
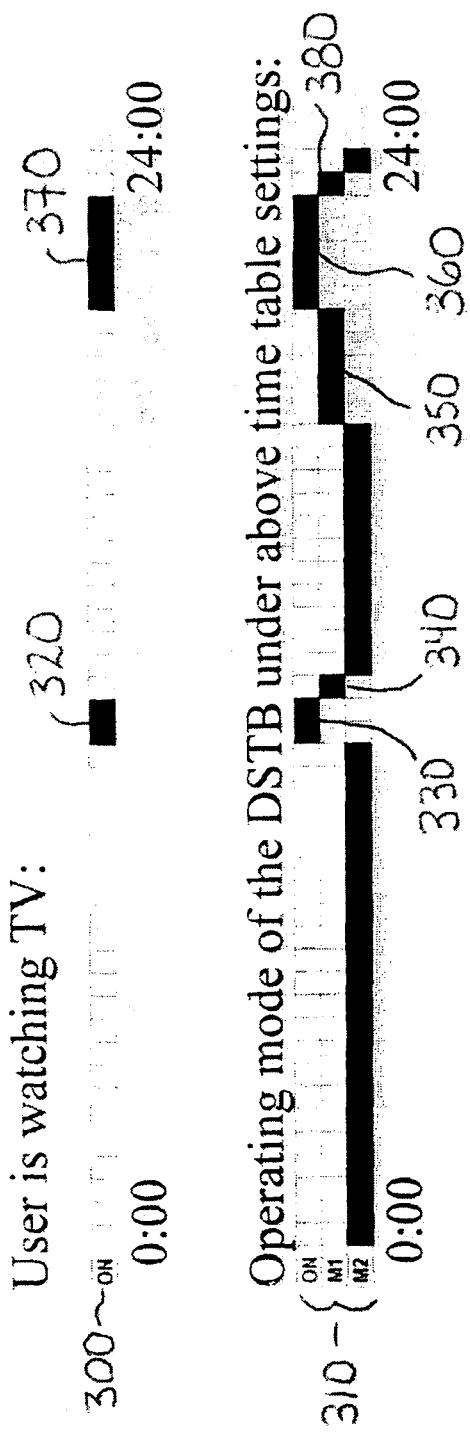
FIG. 3 shows graphs representing the operation of the apparatus of FIG. 1 according to another exemplary embodiment of the present invention.

Referring to FIG. 3, graphs 300 and 310 representing the operation of apparatus 100 according to another exemplary embodiment of the present invention are shown. According to this exemplary embodiment, apparatus 100 automatically switches from first stand-by mode M1 to second stand-by mode M2 a predetermined time period (in this example 30 minutes, although other periods of time could be employed) after the user has finished watching television and apparatus 100 is turned off (overriding user settings if necessary). This exemplary embodiment is particularly advantageous since it prevents apparatus 100 from going into second stand-by mode M2 too early, and thereby avoids a long start-up time if the user wants to restart watching television a short time later.

As indicated by graph 300 of FIG. 3, the user is watching television (and thus apparatus 100 is turned on) between 11:00 and 12:00 (block 320) and between 20:30 and 23:00 (block 370). Also in FIG. 3 it is assumed that the same user settings from FIG. 2 apply, namely that the user has set apparatus 100 to be in first stand-by mode M1 between 18:00 and 22:00, and to be in second stand-by mode M2 for the remaining time periods. As explained above, these user settings are overridden and do not apply for the time period(s) when apparatus 100 is turned on.

Graph 310 of FIG. 3 then shows the operation of apparatus 100 with the aforementioned exemplary user settings in place. In particular, apparatus 100 is turned on for user viewing between 11:00 and 12:00 (blocks 320 and 330). When apparatus 100 is turned off at 12:00, apparatus 100 switches to first stand-by mode M1 for 30 minutes (block 340), thus essentially overriding the user's settings for this 30 minute period. After this 30 minute period, apparatus 100 then automatically switches to second stand-by mode M2, consistent with the user's settings. Later at 18:00, apparatus 100 automatically switches from second stand-by mode M2 to first stand-by mode M1 (block 350), pursuant to the user's settings. Next, apparatus 100 is turned on and the user is watching television between 20:30 and 23:00 (blocks 360 and 370). When apparatus 100 is turned off at 23:00, apparatus 100 switches to first stand-by mode M1 for 30 minutes (block 380), thus essentially overriding the user's settings for this 30 minute period. After this 30 minute period, apparatus 100 then automatically switches to second stand-by mode M2, consistent with the user's settings.

Figure 4:
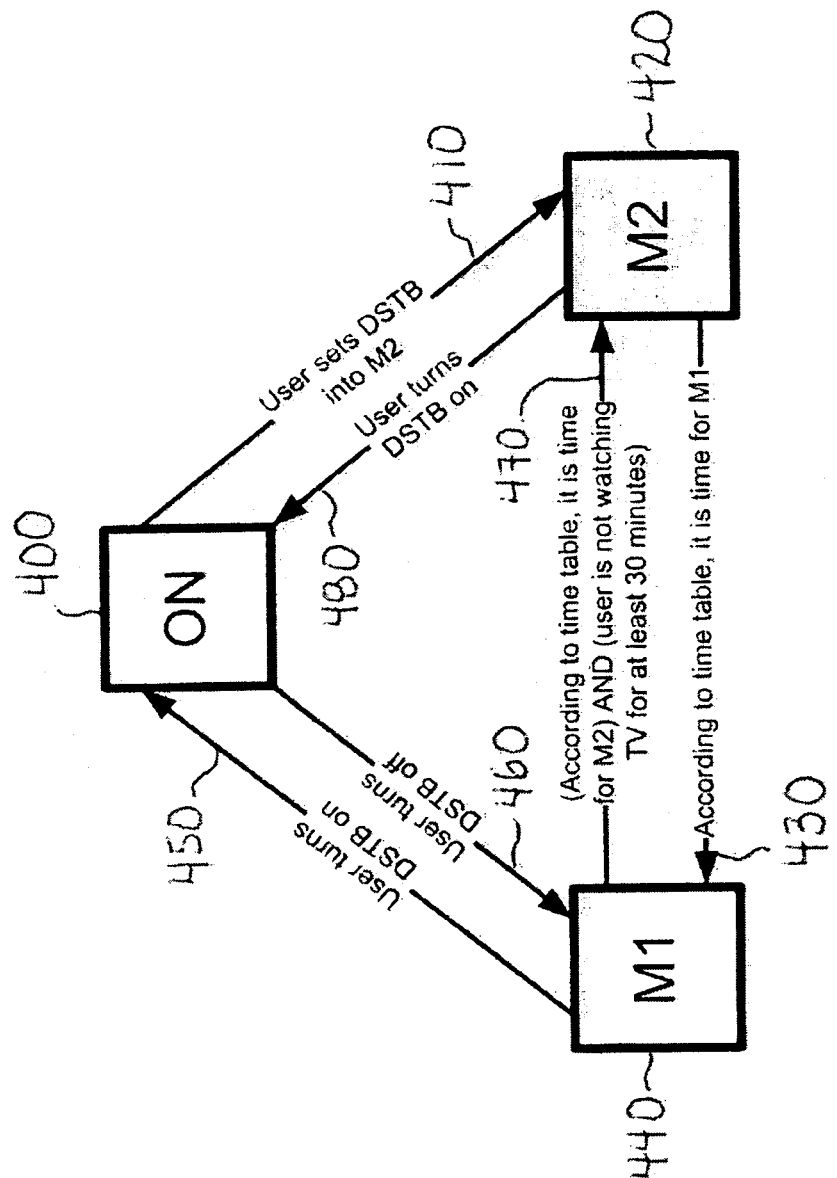
FIG. 4 shows a flow diagram according to an exemplary embodiment of the present invention.

Referring to FIG. 4, a flow diagram according to an exemplary embodiment of the present invention is shown. The exemplary embodiment of FIG. 4 includes principles from the exemplary embodiment of FIG. 3 and provides an additional feature to save energy by enabling the user to set apparatus 100 directly into second stand-by mode M2 without waiting the predetermined time period (e.g., 30 minutes).

According to FIG. 4, when apparatus 100 is in the on state (block 400), a user may turn apparatus 100 off and set it directly into second stand-by mode M2 (without waiting the predetermined time period) by pressing a predetermined key (e.g., an "off" key) on a remote control device or FPA 10 twice within a predetermined time period or by pushing this key for a predetermined time period (e.g., 5 seconds) (line 410). When apparatus 100 is in second stand-by mode M2 (block 420), it switches to first stand-by mode M1 (block 440) according to user settings in the aforementioned time table (line 430). When apparatus 100 is in first stand-by mode M1 (block 440), a user may turn apparatus 100 to the on state (block 400) by pressing a predetermined key (e.g., an "on" key) on a remote control device or FPA 10 (line 450).

Also when apparatus 100 is in the on state (block 400), a user may turn apparatus 100 off by pressing a predetermined key (e.g., the "off" key) on a remote control device or FPA 10 (line 460). Turning apparatus 100 off in this manner causes apparatus 100 to enter first stand-by mode M1 (block 440) by default. When apparatus 100 is in first stand-by mode M1 (block 440), it switches to second stand-by mode M1 (block 420) according to user settings in the aforementioned time table if the user has not watched television (i.e., apparatus 100 has not been turned on) for the predetermined time period (e.g., 30 minutes) (line 470). Also, when apparatus 100 is in second stand-by mode M2 (block 420), a user may turn apparatus 100 to the on state (block 400) by pressing a predetermined key (e.g., an "on" key) on a remote control device or FPA 10 (line 480).

Figure 5:
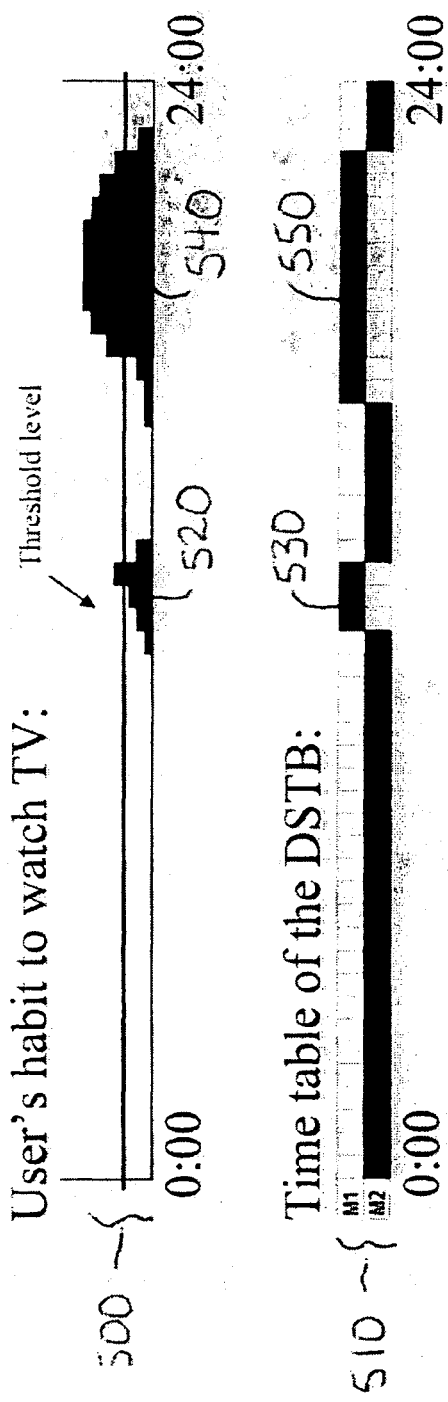
FIG. 5 shows graphs representing the operation of the apparatus of FIG. 1 according to yet another exemplary embodiment of the present invention.

Referring to FIG. 5, graphs 500 and 510 representing the operation of apparatus 100 according to yet another exemplary embodiment of the present invention are shown. According to this exemplary embodiment, apparatus 100 includes an automatic learning method (i.e., statistical mode) to define a time table for first and second stand-by modes M1 and M2 by itself based on a statistical evaluation of the user's viewing habits. With this exemplary embodiment, the amount of viewing time (i.e., time that apparatus 100 is turned on) within each time period of a given day is accumulated for a predetermined period of time (e.g. for the last 30 days, etc.) and a threshold level (see black line in graph 500) is used for evaluating the statistic. The threshold level used may be defined by the user. Also, the amount of viewing time within each time period may be accumulated in the form of points, wherein "points" may represent the amount of time apparatus 100 is turned on during each time period. One aspect of the exemplary embodiment of FIG. 5 is that apparatus 100 switches from second stand-by mode M2 to first stand-by mode M1 a predetermined time period (e.g., 1 hour, etc.) before the threshold level is met or exceeded to avoid annoying the user with long start-up times after turning apparatus 100 on.

Graphs 500 and 510 of FIG. 5 show how a time table for first and second stand-by modes M1 and M2 may be defined according to the aforementioned statistical mode of the present invention. As indicated in graph 500, a user's viewing habits are represented by blocks 520 and 540. Based on these viewing habits shown in graph 500, apparatus 100 automatically defines a time table as represented in graph 510. As indicated in graph 510, apparatus 100 is in first stand-by mode M1 from 12:00 to 13:30 (block 530) and from 17:00 to 22:30 (block 550), and in second stand-by mode M2 for the remaining time periods according to the statistically defined time table.

Figure 6:
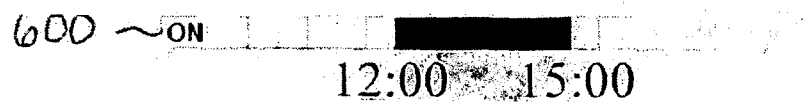
FIG. 6 shows graphs relating to accumulating points in a statistical mode according to an exemplary embodiment of the present invention.
Figure 6:
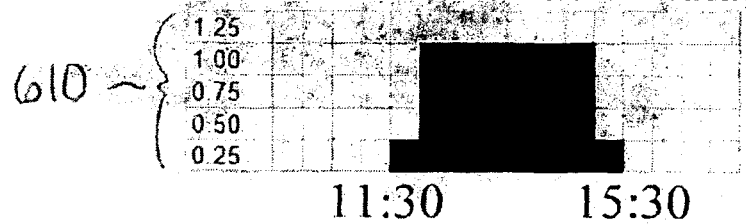

Referring to FIG. 6, graphs 600 and 610 relating to accumulating points in the aforementioned statistical mode according to an exemplary embodiment of the present invention are shown. In particular, to smooth and enhance the statistical evaluation in the exemplary embodiment of FIG. 5, the amount of time that apparatus 100 is turned on may not only be added within the applicable time periods, but also partly before and after these time periods. For example, if the user is watching television (i.e., apparatus 100 is turned on) from 12:00 to 15:00, as represented in graph 600, the time periods that are 30 minutes before and after this watching time period each get 25% of an "accumulation-point" too, as represented in graph 610. Of course, 25% is just an example and other percentages or time period units may also be used.

Figure 7:
FIG. 7 shows graphs relating to accumulating points in a statistical mode according to another exemplary embodiment of the present invention.
Figure 7:
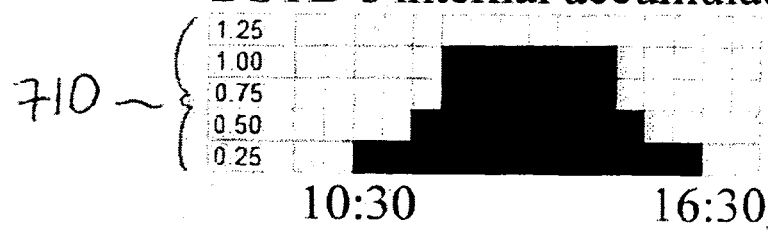

Referring to FIG. 7, graphs 700 and 710 relating to accumulating points in the aforementioned statistical mode according to another exemplary embodiment of the present invention are shown. According to this exemplary embodiment, the "smoothing" described above with reference to FIG. 6 can be done even more finely by not only influencing the first previous and following time periods (as in FIG. 6), but also by influencing the second, third (and/or further) previous and/or following time periods. This may be done in a linear, nonlinear, ascending and/or descending manner. For example, if the user is watching television (i.e., apparatus 100 is turned on) from 12:00 to 15:00, as represented in graph 700, the time periods that are 30 minutes before and after this watching time period each get 50% of an "accumulation-point", and the time periods that are 60 and 90 minutes before and after this watching time period each get 25% of an "accumulation-point" too, as represented in graph 710. Of course, these percentages are just an example and other percentages or time period units may also be used.

As with the manual setting of time periods in the time table, the setting of time periods in the statistical mode can also be calculated only for one day (i.e., no differences between the weekdays or weekends) or can be calculated for each weekday, weekend day, or day individually to more closely match a user's viewing habits.

Figure 8:
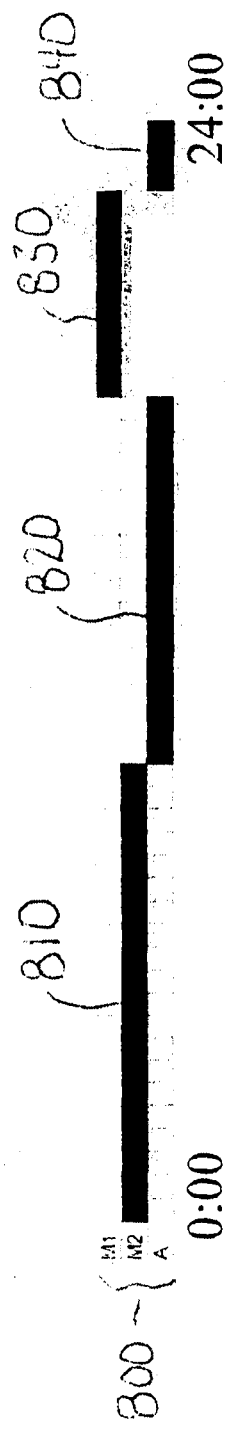
FIG. 8 shows a graph representing the operation of the apparatus of FIG. 1 according to still yet another exemplary embodiment of the present invention.

Referring to FIG. 8, a graph 800 representing the operation of apparatus 100 according to still yet another exemplary embodiment of the present invention is shown. According to this exemplary embodiment, the manual definition method and the automatic learning method (i.e., statistical mode) described above may be combined to produce a combined method. With this exemplary embodiment, a user is provided with three different options for each time period of a day. In particular, the user is able to decide for each time period if he wants to set apparatus 100 into first stand-by mode M1 or second stand-by mode M2, or if apparatus 100 has to handle the time period by itself automatically (e.g., apparatus 100 selects either first stand-by mode M1 or second stand-by mode M2 for the time period according to the statistical mode described above, or another statistical-based technique). Advantageously, the start and stop time of each time period may be defined by the user.

Graph 800 shows an example of how the aforementioned combined method may be used. As indicated in graph 800, a user has set apparatus 100 as follows: second stand-by mode M2 from 0:00 to 10:00 (block 810), statistical mode (i.e., automatic) from 10:00 to 18:00 (block 820), first stand-by mode from 18:00 to 22:30 (block 830) and statistical mode (i.e., automatic) from 22:30 to 24:00 (block 840). This can be done to apply to all days, in which case, the set-up for a single day is used for every day of the week. Alternatively, weekdays and weekends may be independently defined, or each day of the week may be independently defined.

Figure 9:
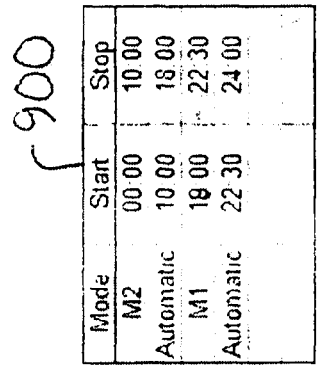
FIG. 9 shows a user interface for controlling an apparatus having first and second stand-by modes according to an exemplary embodiment of the present invention.

FIG. 9 shows an exemplary user interface 900 that may be provided as an on-screen menu to facilitate user entries for the aforementioned combined method. As indicated in FIG. 9, user interface 900 comprises a time table made up of a plurality of different time periods of a day, each having a start time and a stop time that may be defined by the user. User interface 900 is exemplary only and other types of user interfaces may also be used according to the present invention. As with other embodiments, and as indicated above, according to the combined method, the user may define the time table represented in FIG. 9 for a single day which is used for every day of the week. Alternatively, weekdays and weekends may be defined separately. Alternatively still, each day of the week may be defined independently.

It is also noted that the aforementioned combined method is not limited to using the automatic learning method (i.e., statistical mode) of FIG. 5. Rather, any type of method or technique that employs a statistical evaluation of a user's past viewing habits may be used in the combined method without departing from the scope and spirit of the present invention.

As described above, the present invention provides a method for operating an apparatus, such as a video signal receiver, having multiple stand-by modes when the apparatus is in an off state. The present invention is particularly advantageous in that it can provide a desired balance between conserving power and avoiding long waits during a start-up sequence.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A video signal receiver having first and second stand-by modes when in an off state, wherein said first stand-by mode consumes a different amount of power than said second stand-by mode, said video signal receiver comprising:
   a processor operative to enable display of a user interface allowing user selections for a plurality of different time periods of a day, and to enable a user to select, via said user interface, one of at least three different options for each one of said different time periods, wherein a first one of said options includes setting said video signal receiver to said first stand-by mode for said time period, a second one of said options includes setting said video signal receiver to said second stand-by mode for said time period, and a third one of said options includes setting said video signal receiver to a statistical mode for said time period, wherein said statistical mode includes setting said video signal receiver to one of said first and second stand-by modes for said time period based on a user's past viewing habits during said time period, and the user's past viewing habits are determined by an amount of accumulated time said video signal receiver is turned on and said video signal receiver is switched from said second stand-by mode to said first stand-by mode at another time period before the amount of accumulated time exceeds a threshold;
   a memory operative to store data corresponding to said user selections; and
   wherein said video signal receiver enters said first stand-by mode in response to a power off key being pressed by the user, and said video signal receiver automatically switches from said first stand-by mode to said second stand-by mode, said first stand-by mode consumes more power than said second stand-by mode, according to said user selections if said video signal receiver has not been on for a predetermined time period.

2. The video signal receiver of claim 1, wherein said predetermined time period is at least 30 minutes.

3. The video signal receiver of claim 1, wherein said statistical mode includes accumulating points while said video signal receiver is in an on state.

4. The video signal receiver of claim 1, wherein each one of said different time periods includes a start time and a stop time defined by a user.

5. A method for operating an apparatus having first and second stand-by modes when said apparatus is in an off state, wherein said first stand-by mode consumes a different amount of power than said second stand-by mode, said method comprising:

enabling display of a user interface allowing user selections for a plurality of different time periods of a day; and enabling a user to select, via said user interface, one of at least three different options for each one of said different time periods, wherein a first one of said options includes setting said apparatus to said first stand-by mode for said time period, a second one of said options includes setting said apparatus to said second stand-by mode for said time period, and a third one of said options includes setting said apparatus to a statistical mode for said time period, wherein said statistical mode includes setting said apparatus to one of said first and second stand-by modes for said time period based on a user's past viewing habits during said time period, and the user's past viewing habits are determined by an amount of accumulated time said video signal receiver is turned on and said video signal receiver is switched from said second stand-by mode to said first stand-by mode at another time period before the amount of accumulated time exceeds a threshold; and wherein said apparatus enters said first stand-by mode in response to a power off key being pressed by the user, and said apparatus automatically switches from said first stand-by mode to said second stand-by mode, said first stand-by mode consumes more power than said second stand-by mode, according to said user selected options if said apparatus has not been on for a predetermined time period.

6. The method of claim 5, wherein said predetermined time period is at least 30 minutes.

7. The method of claim 5, wherein said statistical mode includes accumulating points while said apparatus is in an on state.

8. The method of claim 5, wherein each one of said different time periods includes a start time and a stop time defined by a user.

9. The method of claim 5, wherein said apparatus comprises a video signal receiver.

* * * * *